Sept. 6, 1938. C. ADLER, JR 2,129,602
SIGNAL
Filed Dec. 20, 1937 2 Sheets-Sheet 2
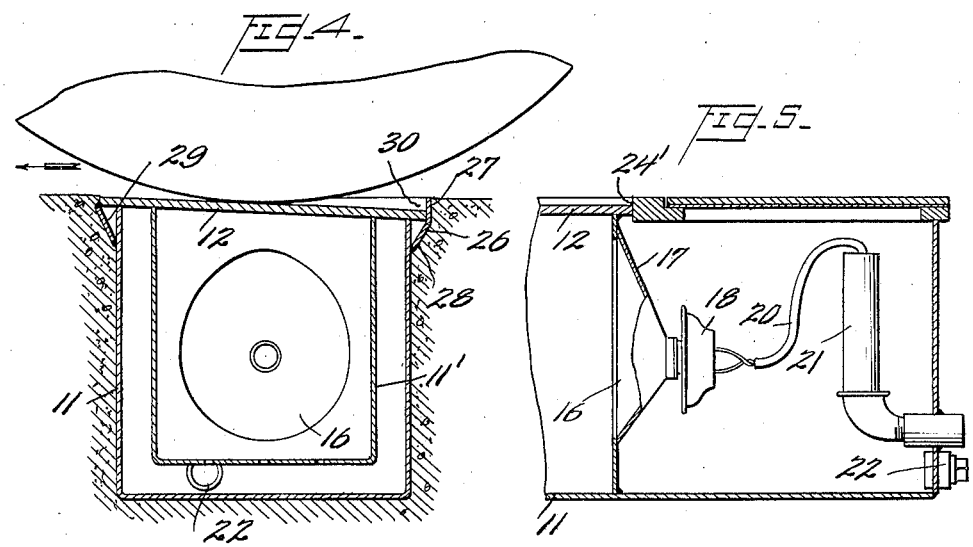

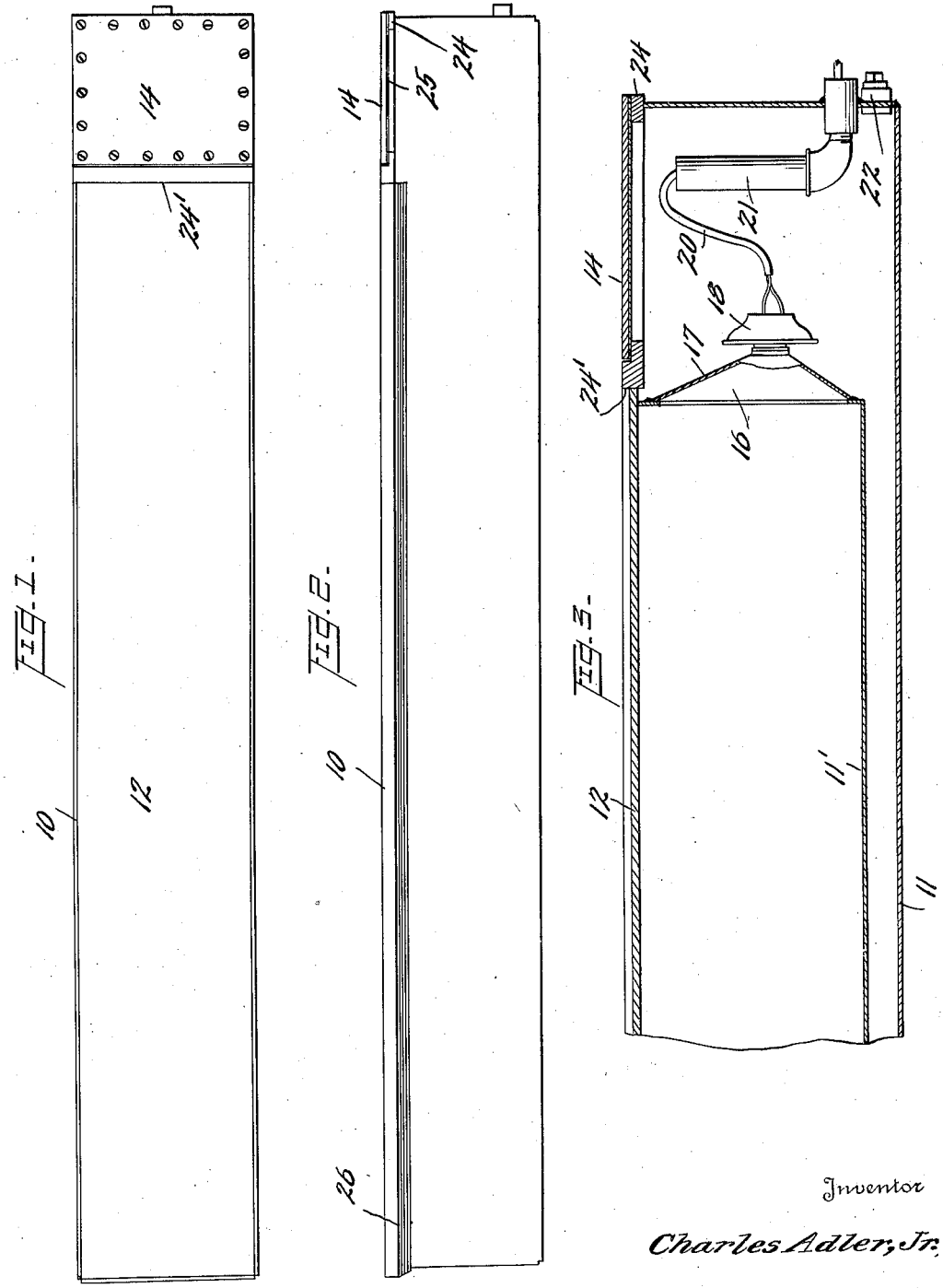

Patented Sept. 6, 1938

2,129,602

UNITED STATES PATENT OFFICE 2,129,602

SIGNAL

Charles Adler, Jr., Baltimore, Md.

Application December 20, 1937, Serial No. 180,898

6 Claims. (Cl. 177—329)

This invention relates to signals and particularly signals for highways which are vehicle actuated. In signals of this character, it has been customary to use elements disposed in the highway similar to that described in my United States Patent No. 1,919,874, July 24, 1933, upon which the present invention is an improvement.

It is the primary object of the present invention to enhance the efficiency of such elements. To this end, particularly, the present invention enables the sound produced to be controlled and at the same time increases riding comfort and reduces wear upon the element.

By a control of the sound produced, I mean that with the construction shown in my aforesaid patent, the impact at times between the vehicle wheel and the sounding board was not always at the critical point or area for creating maximum sound. With the present invention, I am able to regulate this impact so that, at all times, there is a uniform maximum impact or engagement of the wheel with the top plate of the highway element. In this manner, optimum sound is produced, and the impact takes place on an area intermediate the top plate which I find to be the most efficient point for creating vibrations and for assuring that they will be properly picked up by the sound responsive means.

It is, of course, well known that the balloon tire has made inappreciable to the occupants of a vehicle the usual slight depressions encountered in travel over the highway.

With this in mind, I have constructed the improved highway element so as to provide a depression of very small magnitude in the path of the oncoming vehicle. This depression is formed by an inclined plate, the lower end of which is nearer to oncoming traffic. Such construction enables the tire to engage the intermediate area of the top and produce an impact sufficient to create a sound which may be readily picked up by sound sensitive means and suitably amplified for signal purposes.

In addition to the above objects, it is an important consideration with the present invention that the construction is relatively much cheaper than the construction previously employed in that I am able to eliminate the use of a selector plate and, in doing so, provide a highway element which makes the road surface substantially unobstructed.

For certain purposes, as where a vehicle travels at a very slow rate, I have discovered that the sound produced may be enhanced by providing on the top of the plate a plurality of raised portions such as corrugations or projections. These produce a multiplicity of impacts and assure that the volume of sound will be sufficient to actuate the sound responsive beans and the signal mechanism.

A further object of the invention is to provide a highway element of this character which is uni-directional in its response to traffic. That is to say, I provide an element in which only the sound produced by the vehicle moving in one direction and in the proper lane will be registered by the sound responsive means.

The highway element is capable of easy application and is free from moving parts so that once disposed in the ground, it will have a long life.

Moreover, by having the tire strike the inclined plate intermediate the area thereof while moving up an inclined plane, I have discovered that there is a substantial reduction in wear upon the element which is a very important feature of the invention.

Referring to the drawings:

Figure 1 is a plan view of one of my improved highway elements which is disposed in a roadway for operating various types of traffic actuated signals; since the signals may be of many different types, and are well understood in the art, no particular signal has been illustrated.

Figure 2 is a side elevation.

Figure 3 is a longitudinal sectional view partly broken away.

Figure 4 is a transverse section of the highway element shown in Figures 1, 2 and 3, and illustrating the manner in which a tire engages the intermediate portion of the inclined plate and travels up the same to the road surface which is flush with the upper edge of the plate.

Figure 5 is a sectional view showing the location of the microphone within the detector.

Figures 6 and 7 are top elevations of modified forms of surfaces for the sounding board in the constructions shown in Figures 1 to 5.

Figure 8 is a detail view in section showing the manner in which the collector cone is attached to the microphone, and Figure 9 is a sectional view showing how the detachable top plate is secured to the body of the element.

Referring to Figure 1, I have illustrated at 10, a highway element constructed in accordance with this invention. This element is disposed in the highway so as to be in the path of moving traffic, and each element is disposed so that its top surface will be engaged by the wheels of vehicles passing over the highway, as shown in Figure 4. The sound created by the impact of the vehicle tires upon the element will be picked up by suitable sound sensitive means and translated into electrical impulses for controlling the signal mechanism.

The highway element shown in Figures 3 and 4 is in the form of an outer metallic shell 11 within which is disposed an inner metal shell 11' in spaced relation thereto. Both shells are rectangular and have closed ends and sides. They are closed by a top plate 12 forming the sounding board over which traffic passes and to which their edges are welded. The inner shell depends from the top as shown, so that it vibrates due to traffic moving over the sounding board. The top plate is of an area greater than that of the outer shell so that it projects beyond the walls of the same at the sides and one as at 13. At one end a cover plate 14 is provided which is detachably secured to the outer shell in a manner as will be later described. Referring to Figure 3, the wall of the inner shell at one end is provided with an opening 16 which is closed by a conical collector member 17 for directing the vibrations to a suitable microphone 18 connected to the member as shown at 19 in Figure 3. From the microphone, suitable wires 20 are carried through a sealed conduit 21 to the electrical mechanism. A suitable outlet 22 is provided in the outer shell for permitting drainage and clean-out of the shell. It will be noted that the cover 14 enables the microphone and associated parts to be reached in the event this is necessary. As shown in Figure 9, the cover is connected by screws 23 to a frame 24 welded to the upper edges of the outer shell and the adjacent edge of the top plate, a suitable gasket 25 being interposed between the frame and the cover. The upper surface of the cover is disposed flush with the highway surface when the element is in position in a roadway.

In the construction shown in Figure 5, the inner shell is omitted, but in all other respects, the arrangement is similar to that described in connection with Figure 3, wherein the element includes the inner shell. While the construction shown in Figure 3 is preferred, that illustrated in Figure 5 is equally operable for setting up vibrations which may be satisfactorily translated into electrical impulses for operating the signal.

Referring to Figure 4, the top plate is provided along its longitudinal edge nearest to oncoming traffic with a flange or rim member 26 having an upstanding portion 27 forming the rim which is welded to the top plate and extends above the same as shown, and a downwardly and inwardly inclined portion 28, the end of which is welded to the adjacent side wall of the shell 11. This member 26 extends throughout the length of the top plate. A similar member 26 is provided at the end of the element opposite the end to which the cover 14 is applied, and a metal reinforcing member 29 is welded to the top plate and wall of the housing 11 at the opposite longitudinal edge of the top plate. The members 26 and 29 act to strengthen and sustain the top plate and with the adjacent edge 24' of the frame cooperate with the top plate in the manner which will now be described.

The top plate 12 is inclined with respect to the plane of the surface of the roadway, and its lower edge is disposed below the surface of the roadway nearest to oncoming traffic. The depression which is formed by the top surface of the lower edge of the plate 12 and the top edge of the rim 27 is about ⅝ of an inch deep and the top plate at its opposite edge is flush with the roadway as shown. Since the top plate is twelve inches wide, the magnitude of the depression 30 is practically negligible and does not occasion any riding discomfort to passengers of vehicles travelling over the element.

However, the depression 30 accomplishes several improved results. In the first place, it enables the impact to be controlled so that the tire engages the top plate substantially intermediate the area thereof as shown in Figure 4. This is desirable since it insures that substantially uniform vibrations will be set up. Furthermore, as the vehicle is travelling up an inclined plane merging with the surface of the roadway, the wear upon the element is reduced to a minimum. Also, it is unnecessary to employ in the present construction, a selector plate such as is shown and described in my aforesaid patent, thereby greatly reducing the expense of the element.

This construction, moreover, enables the element to be uni-directional in that by controlling the sensitivity of the sound sensitive means employed, operation of the signal by vehicles moving over the element in an improper manner will not be registered. It is to be understood that any suitable sound sensitive means may be used.

The depression 30 formed by the construction just described, affords a very simple and positive means for regulating or controlling the impact produced by the travel of a vehicle over the highway element. That is to say, the wheel will strike the top on an area X intermediate the top plate which I find enables the sound to be produced at the optimum and at the best point for reception by the sound sensitive means. This is important in that the highway element is universally applicable to the extent that the travel of both slow and rapidly moving vehicles will serve to actuate the signal. While in some instances the impacts created along edges of the highway element have been satisfactory, I have discovered that for an efficient operation, it is essential that the impact take place intermediate the top or sounding board, as close as possible to the longitudinal center line thereof which will enable the same to be efficiently picked up by the sound sensitive means or microphone. This result is obtained by the present invention and, at the same time, the roadway is substantially unobstructed. Furthermore, the extent of the depression 30 is so slight that the impacts upon the inclined surface do not create any strain upon the top, such impacts being simply the resultant of two components, namely, the force of gravity and the directional force of the vehicle as the tire bridges the gap created by the depression.

Referring to Figures 6 and 7, I have illustrated the top 11 provided in Figure 6 with a corrugated surface and in Figure 7 with a multiplicity of projections. This construction may be used with either of the highway elements previously described or with a highway element in which the top 11 is parallel with the plane surface of the roadway, i. e., is not inclined. The purpose of producing this irregular surface is to assure in the case of slow moving traffic that a sufficient number of impacts will be created as to produce sound sufficient to be picked up by the sound sensitive means and actuate the signal mechanism. In the case of the corrugated top, the corrugations extend transversely of the roadway.

It will be understood, of course, that other types of irregular surfaces may be produced for accomplishing similar results, the two constructions shown being simply for purposes of illustration.

The presence of the rim construction shown in addition to forming a strengthening means for the top plate of the element also aids in preventing the concrete from breaking loose about the element, so that once disposed in the ground, the element will require little further attention over long periods.

The invention is subject to considerable change and it is considered that all modifications which are within the purview of the invention are comprehended in the appended claims.

I claim:

1. A vehicle actuated highway element comprising a shell in the highway, said shell having a top arranged in a plane inclined to the plane of the highway surface, the base of the inclination being closer to oncoming traffic and disposed below the road surface but leaving the surface unobstructed, the inclination of the top being upward in the direction of travel of the vehicle and such that an impact is made on the top by the engagement of the vehicle wheel which is the resultant force created by the forces of gravity and directional motion of the vehicle wheel as it bridges the depression formed by the inclined area of the top which is disposed below the road surface at the approach side of the element, whereby sound is produced, and a sound responsive element associated with the shell and converting the sound into electrical impulses.

2. A highway element in accordance with claim 1 in which the top is provided with an irregular surface.

3. A vehicle actuated highway element comprising a shell, said shell having a top arranged in an inclined plane, and a rim at said top extending above the base of the inclined portion to form therewith a depression.

4. A highway element in accordance with claim 3 in which the top is provided with an irregular surface.

5. A vehicle actuated highway element comprising an outer shell and an inner shell, the top of the element being arranged in an inclined plane, a sound responsive element associated with the inner shell and responsive to vibrations set up by the movement of a vehicle over said top.

6. A vehicle actuated highway element comprising an outer shell and an inner shell, the top of the element being arranged in an inclined plane, a sound responsive element associated with the inner shell and responsive to vibrations set up by the movement of a vehicle over said top, said sound responsive element having a sensitivity susceptible of picking up sound only when the vehicle is traveling in a proper direction.

CHARLES ADLER, Jr.